(12) United States Patent
Vadillo (10) Patent No.: US 9,914,548 B1
(45) Date of Patent: Mar. 13, 2018

(54) USB POWER MANAGEMENT AND LOAD DISTRIBUTION SYSTEM

(71) Applicant: IMAGIK INTERNATIONAL CORPORATION, Miami, FL (US)

(72) Inventor: Pablo Vadillo, Coral Gables, FL (US)

(73) Assignee: Imagik International Corporation, Miami, FL (US)

( * ) Notice: Subject to any disclaimer, the term of this patent is extended or adjusted under 35 U.S.C. 154(b) by 0 days.

(21) Appl. No.: 15/439,528

(22) Filed: Feb. 22, 2017

(51) Int. Cl.
| B60L 1/00 | (2006.01) |
| B64D 47/00 | (2006.01) |
| H02M 7/02 | (2006.01) |
| H02J 7/00 | (2006.01) |

(52) U.S. Cl.
CPC ............ B64D 47/00 (2013.01); H02J 7/0044 (2013.01); H02J 7/0052 (2013.01); H02M 7/02 (2013.01); *H02J 2007/0062* (2013.01)

(58) Field of Classification Search
CPC ...... B64D 47/00; H02J 7/0044; H02J 7/0052; H02J 2007/0062; H02M 7/02
USPC ......................................................... 307/9.1
See application file for complete search history.

(56) References Cited

U.S. PATENT DOCUMENTS

| 5,754,445 | A | 5/1998 | Jouper et al. |
| 5,936,318 | A * | 8/1999 | Weiler ............... H02J 4/00 307/18 |
| 6,018,690 | A | 1/2000 | Saito et al. |
| 6,921,987 | B2 | 7/2005 | Marin-Martinod |
| 7,020,790 | B2 | 3/2006 | Mares |
| 7,098,555 | B2 | 8/2006 | Glahn et al. |
| 7,162,653 | B2 | 1/2007 | Mares et al. |
| 7,555,365 | B2 | 6/2009 | Bhakta |
| 7,573,228 | B2 | 8/2009 | Karner et al. |
| 7,627,399 | B2 | 12/2009 | Kimble et al. |
| 7,705,484 | B2 | 4/2010 | Horst |
| 7,750,498 | B2 | 7/2010 | Wight et al. |
| 7,825,622 | B2 | 11/2010 | Nakamura |
| 7,948,113 | B2 | 5/2011 | Abe |
| 8,053,925 | B2 | 11/2011 | Jouper |

(Continued)

FOREIGN PATENT DOCUMENTS

| DE | 1028512 | 4/2010 |
| FR | 1650846 | 4/2006 |

*Primary Examiner* — Rexford Barnie
*Assistant Examiner* — Elim Ortiz
(74) *Attorney, Agent, or Firm* — The Concept Law Group, P.A.; Scott D. Smiley (57) ABSTRACT

A power management system includes a power management and load distribution (PMLD) circuit within an airplane coupled to an AC power source, at least one AC/DC conversion circuit operable to convert the AC power into a DC power, and at least one programmable output capability outlet (PPCO) circuit operable to receive the DC power. The PMLD circuit stores a predetermined maximum power limit, continuously measures a power output, and increases or decreases a power capability setting based on a comparison of the measured power output to the predetermined maximum power limit. The PPCO circuit includes a USB connector couplable to a personal electronic device (PED) of a passenger for charging the PED at an amount of DC power indicated by the power capability setting. The PPCO circuit is also operable to negotiate a power contract with the PED.

20 Claims, 6 Drawing Sheets

Smart Power Management and Load Distribution System

(56) References Cited

U.S. PATENT DOCUMENTS

| | | |
|---|---|---|
| 8,143,742 B2 | 3/2012 | Maloney |
| 8,195,108 B2 | 6/2012 | Sheynblat et al. |
| 8,260,522 B2 | 9/2012 | Botura et al. |
| 8,295,065 B2 | 10/2012 | Jouper |
| 8,378,520 B2 | 2/2013 | Gehring et al. |
| 8,410,633 B2 | 4/2013 | Batzler et al. |
| 8,415,830 B2 | 4/2013 | Lim et al. |
| 8,615,332 B2 | 12/2013 | Heilman et al. |
| 8,692,409 B2 | 4/2014 | Jouper |
| 8,788,106 B2 | 7/2014 | Stothers et al. |
| 8,829,712 B2 | 9/2014 | Mahria |
| 8,897,924 B2 | 11/2014 | Nilsen et al. |
| 9,190,841 B2 | 11/2015 | Kritt et al. |
| 9,201,481 B2 | 12/2015 | Hirosaka |
| 9,229,514 B2 | 1/2016 | Humphrey et al. |
| 9,379,547 B2 | 6/2016 | Takehara et al. |
| 9,397,515 B2 | 7/2016 | Tischer |
| 9,438,043 B2 | 9/2016 | Jouper et al. |
| 9,455,577 B2 | 9/2016 | Bhageria et al. |
| 9,481,332 B1 | 11/2016 | Lee |
| 9,533,637 B2 | 1/2017 | Gaynier |
| 2004/0021371 A1 | 2/2004 | Jouper |
| 2004/0232769 A1 | 11/2004 | Pickering |
| 2008/0001583 A1 | 1/2008 | Brown et al. |
| 2010/0301825 A1* | 12/2010 | Yamaguchi ......... H02M 3/1588 323/284 |
| 2011/0087382 A1 | 4/2011 | Santacatterina et al. |
| 2012/0319826 A1 | 12/2012 | Potter |
| 2013/0241284 A1 | 9/2013 | Santini et al. |
| 2014/0117753 A1 | 5/2014 | Pradier et al. |
| 2014/0325245 A1* | 10/2014 | Santini ..................... H02J 1/14 713/300 |
| 2015/0097433 A1 | 4/2015 | Shichino |
| 2015/0123464 A1 | 5/2015 | Hess |
| 2015/0148995 A1 | 5/2015 | Scheffler et al. |
| 2015/0162778 A1 | 6/2015 | Inoue et al. |
| 2015/0244173 A1 | 8/2015 | Nomura |
| 2015/0277461 A1 | 10/2015 | Anderson et al. |
| 2015/0326134 A1 | 11/2015 | Jouper |
| 2015/0333545 A1 | 11/2015 | Luce |
| 2016/0054394 A1 | 2/2016 | Jouper |
| 2016/0072293 A1 | 3/2016 | Jouper |
| 2016/0211683 A1 | 7/2016 | Peabody et al. |

* cited by examiner

FIG. 1
Smart Power Management and Load Distribution System

FIG. 2

Power Management and Load Distribution (PMLD) Circuit

FIG. 3

AC/DC Conversion Circuit

FIG. 4

Programmable Power Capability Outlet (PPCO) Circuit

FIG. 5
Personal Electronic Device (PED)

FIG. 6

USB POWER MANAGEMENT AND LOAD DISTRIBUTION SYSTEM

FIELD OF THE INVENTION

The present invention relates generally to power management and load distribution systems, and, more particularly, relates to a system that manages power distribution from a limited AC power source for charging personal electronic devices.

BACKGROUND OF THE INVENTION

Commercial passenger aircraft conventionally include 115V AC, 400 Hz electrical systems to supply power for the operation of on-board electrical loads. The AC power source for aircraft is typically one or more engine-driven generators with a fixed power capacity. In such fixed power supply environment, additional ancillary electrical loads in the aircraft could result in an over-demand condition on the electrical system, i.e., the fixed capacity generators.

With that being said, there is an ever-increasing demand from passengers on commercial passenger aircrafts to power their portable personal electronic devices ("PEDs"), such as, for example, smart phones, tablets, laptops, etc. In addition, many commercial passenger aircrafts provide for wireless Internet connection to such PEDs, which even more so increases the consumer demand to use PEDs on a flight to access the Internet for personal, as well as, work purposes. However, the problem remains that aircrafts have a limited power supply. This increased demand for power supply to a multitude of passenger PEDs was not considered a part of the original aircraft design. Therefore, there is a need in the art for a power management system that prevents an over-demand condition on an aircraft's electrical system, while also being able to supply power to a variable number and type of passenger PEDs that may connect to the system during a flight.

Existing systems in the industry that manage the power available to passenger PEDs deny power to the passenger in some manner, such as, for example, disabling the power supply to passenger PEDs at a certain threshold. The primary reason why existing systems deny power to some or all passenger PEDs is that such loads on the aircraft's electrical system by, in some cases, a fairly large number of passengers (e.g., the typical Boeing 747-400 aircraft can transport up to 492 passengers) simultaneously demanding power for their PEDs could overwhelm the aircraft's electrical system, resulting in an unsafe condition. For example, modern PEDs, including laptops, smart devices, and tablets, can draw anywhere from 2.5 W to 100 W. Such power consumption multiplied by hundreds of passengers could overwhelm the aircraft's electrical system in an unsafe manner. At the same time, denial of power to passenger PEDs, while not necessarily unsafe, is still an undesirable outcome and will likely reduce passenger satisfaction.

Universal Serial Bus (USB) is an increasingly pervasive industry standard that defines cables, connectors, and communication protocols used in a bus for connection, data communications, and power supply between computers and electrical devices, such as portable personal electronic devices. USB has become rather commonplace on laptops, smart phones, and tablets.

A fairly recent USB connector, the USB Type C connector, has been released that is smaller than previous USB connectors, such as the Type A connector. The USB Type C connector also enables a connection with a USB receptacle with flipping enabled. The USB Type C connector builds on the most recent USB 3.1 protocol published by the USB Implementers Forum (http://www.usb.org/home). The USB Type C connector is also backwards compatible with older USB protocols.

Furthermore, a new USB Power Delivery (USB-PD) specification was recently developed to enable the delivery of higher power levels through the new USB cables and connectors. The specifications for this technology can be found at http://www.usb.org/developers/powerdelivery/. This technology was developed to create a universal power plug for laptops, tablets, smart phones, etc. that may require more than 5 volts (V) using cables and plugs compatible with existing USB solutions. The USB-PD specification defines a communication link between USB ports connected via a cable supporting USB-PD and connectors supporting USB-PD. The most recent USB-PD specification permits power consumption of up to 100 W to support high power consuming portable devices, such as laptops. Unfortunately, existing power management systems for commercial passenger aircrafts have not been designed to support such high power consuming devices within their fixed power supply environment.

Therefore, a need exists to overcome the problems with the prior art as discussed above.

SUMMARY OF THE INVENTION

The invention provides a power management and load distribution system that overcomes the hereinafore-mentioned disadvantages of the heretofore-known devices and methods of this general type and that intelligently and dynamically manages power and load distribution for a passenger aircraft, without denying power to passenger PEDs.

With the foregoing and other objects in view, there is provided, in accordance with the invention, a power management and load distribution system includes a source of alternating current (AC) power within an airplane; a power management and load distribution (PMLD) circuit within the airplane and coupled to the source, the PMLD circuit having at least one predetermined maximum power limit; and operably configured to continuously measure a power output from the PMLD circuit, and at least one of increase and decrease to a non-zero value a power capability setting based on a comparison of the measured power output to the at least one predetermined maximum power limit; at least one AC/DC conversion circuit communicatively coupled to the PMLD circuit and operable to convert the AC power into a DC power for supplying the DC power to at least one personal electronic device (PED) associated with a passenger of the airplane; and at least one programmable power capability outlet (PPCO) circuit communicatively coupled to the at least one AC/DC conversion circuit, the at least one PPCO circuit operably configured to receive the DC power and the power capability setting; including at least one USB connector selectively couplable to the at least one PED associated with the passenger of the airplane; operable to charge the PED coupled to the at least one USB connector at an amount of DC power indicated by the power capability setting; and operably configured to negotiate a power contract with the PED to change at least one of a DC amperage and a DC voltage of the DC power supplied to the PED.

In accordance with another feature of the present invention, the PMLD circuit is operably configured to decrease to the non-zero value the power capability setting as a result of determining that the measured power output reaches or exceeds the at least one predetermined maximum power limit.

In accordance with a further feature of the present invention, the PMLD circuit is operable to receive an indication of a number of PEDs connected to the at least one PPCO circuit; and the power capability setting is increased as a result of the PMLD circuit determining that the number of PEDs connected to the at least one PPCO circuit was reduced.

In accordance with yet another feature of the present invention, the power capability setting is continuously broadcast from the PMLD circuit to the PEDs connected to the at least one PPCO circuit.

In accordance with yet another feature of the present invention, the power capability setting indicates a maximum amount of power permitted for consumption by one PED connected to one PPCO circuit within an area on the airplane; and the predetermined maximum power limit indicates a total maximum amount of power permitted for consumption by all PEDs connected to all PPCO circuits within the area on the airplane.

In accordance with yet another feature of the present invention, the at least one PPCO circuit includes a DC/DC converter; the power capability setting represents a DC wattage value; and the negotiation of the power contract between the PED and the at least one PPCO circuit includes the PED requesting the DC power at a DC voltage value, and the at least one PPCO circuit utilizing the DC/DC converter to change the DC power supplied to the PED to include the requested DC voltage value and a DC amperage value that does not exceed the DC wattage value represented by the power capability setting.

In accordance with yet another feature, an embodiment of the present invention further includes a configuration plug module (CPM) removably couplable to the PMLD circuit and including a reprogrammable non-transitory memory having stored thereon the at least one predetermined maximum power limit for upload into the PMLD circuit during an initiation/set-up phase of the system, the reprogrammable non-transitory memory being operably configured to be reprogrammed with different predetermined maximum power limits to accommodate use of the CPM to a plurality of airplane models.

In accordance with a further feature of the present invention, the at least one USB connector includes a USB type C connector with USB-PD capability and a USB type A connector.

In accordance with yet another feature of the present invention, the source of AC power includes an engine-driven generator with a fixed power capacity.

In accordance with yet another feature of the present invention, each of the PMLD circuit and the at least one AC/DC conversion circuits is disposed within an aircraft grade line replacement unit (LRU) housing.

In accordance with another feature of the present invention, the at least one PPCO circuit includes a plurality of PPCO circuits, each of the plurality of PPCO circuits disposed on or proximate to a passenger seat within a passenger cabin of the airplane.

In accordance with another feature of the present invention, the at least one predetermined maximum power limit includes a plurality of predetermined maximum power limits; and each of the plurality of predetermined maximum power limits indicates a total maximum amount of power permitted for consumption by all PEDs within one of a plurality of aircraft cabin zones.

In accordance with yet another feature of the present invention, the at least one AC/DC conversion circuit includes a plurality of AC/DC conversion circuits electrically coupled to the PMLD circuit and connected together in series in a daisy chain configuration with at least one power line and at least one data line between each of the plurality of daisy chained AC/DC conversion circuits.

In accordance with yet another feature of the present invention, each of the at least one AC/DC conversion circuit is operably configured to receive the AC power and the power capability setting from the PMLD circuit; includes a microcontroller unit, the microcontroller unit being operably configured to convert the power capability setting from the PMLD circuit into one of a plurality of pulse width modulation (PWM) frequencies, each one of the plurality of PWM frequencies different from each of the other ones of the plurality of PWM frequencies so as to uniquely indicate one of a plurality of predetermined power capability settings stored in a non-transitory memory; and sends the converted one of the plurality of PWM frequencies to the at least one PPCO circuit for communication to the PED.

In accordance with yet another feature of the present invention, the at least one AC/DC conversion circuit includes at least one data input operably configured to receive an attach detection signal from the at least one PPCO circuit, the attach detection signal indicating whether the PED is connected to the at least one PPCO circuit via the USB connector.

In accordance with yet another feature of the present invention, the PPCO circuit includes a microcontroller unit communicatively coupled to a device policy manager, the microcontroller unit being operably configured to receive a pulse width modulation (PWM) frequency representing the power capability setting and convert the PWM frequency into a message for transmission to the device policy manager, the message indicating the power capability setting for the PED connected to the at least one PPCO circuit.

In accordance with yet another feature of the present invention, each of the at least one PPCO circuit includes a microcontroller unit, a device policy manager, a protocol layer, a physical layer, a cable detector, a DC/DC converter, and a current sense circuit.

In accordance with yet another feature of the present invention, the PPCO circuit further includes a $V_{REQ}$ line connecting the device policy manager to the microcontroller unit, the $V_{REQ}$ line operably configured to transmit a voltage change request from the PED connected to the PPCO circuit as part of the negotiation of the power contract; and a $V_{SEL}$ line connecting the microcontroller unit to the DC/DC converter, the $V_{SEL}$ line operably configured to transmit a command to the DC/DC converter to change the DC voltage of the DC power supplied to the PED according to the voltage change request.

In accordance with another feature of the present invention, a power management and load distribution system includes a source of alternating current (AC) power within an airplane having an airplane passenger cabin with a plurality of cabin zones; and a configuration plug module (CPM) including a reprogrammable non-transitory memory having stored thereon a predetermined maximum power limit for each of the plurality of cabin zones; a power management and load distribution (PMLD) circuit within the airplane, the PMLD circuit: operable to receive the AC power from the source; removably couplable to the CPM for receiving the predetermined maximum power limit for each of the plurality of cabin zones from the CPM; and having a plurality of zone modules, each of the plurality of zone modules having at least one microcontroller unit and being operably configured to manage power for one of the plurality of cabin zones by: continuously monitoring a power output to the respective cabin zone, comparing the power output of the respective cabin zone to the predetermined maximum power limit of the respective cabin zone, and determining a power capability setting for the respective cabin zone based on the comparison. The power management and load distribution system may further include, in accordance with a further feature of the present invention, a plurality of AC/DC conversion circuits communicatively coupled to the PMLD circuit and operable to receive the AC power from the PMLD circuit, each of the plurality of AC/DC conversion circuits being operable to: convert the AC power from the PMLD circuit into a DC power for supplying the DC power to one of the plurality of cabin zones; and receive the power capability setting from the zone module configured to manage power for the respective cabin zone; and at least one programmable output capability outlet (PPCO) circuit communicatively coupled to one of the plurality of AC/DC conversion circuits, the at least one PPCO circuit: disposed on or proximate a passenger seat within one of the plurality of cabin zones; operably configured to receive the DC power and the power capability setting from the respective AC/DC conversion circuit; including at least one USB connector selectively couplable to a personal electronic device (PED) associated with an aircraft cabin passenger seated within the passenger seat; operable to charge the PED coupled to the at least one USB connector at an amount of DC power indicated by the power capability setting; and operably configured to negotiate a power contract with the PED.

In accordance with a further feature of the present invention, negotiation of the power contract between the at least one PPCO circuit and the PED includes a request from the PED to the at least one PPCO circuit to change at least one of a DC amperage and a DC voltage of the DC power supplied to the PED.

Although the invention is illustrated and described herein as embodied in a power management and load distribution system, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. The terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient power management and load distribution system that dynamically manages power and load distribution. Preferred embodiments of the present invention are configured to efficiently manage power and load distribution for a passenger aircraft, without denying power to passenger PEDs.

Embodiments of the invention provide a smart power management and load distribution (PMLD) circuit, an AC/DC conversion circuit, and a plurality of USB/USB-PD programmable output capability outlet circuits for charging a plurality of passenger PEDs. In addition, embodiments of the invention provide for the PMLD to receive AC electrical power from the aircraft's electrical system. The PMLD may be connected to the AC/DC conversion circuits to convert the AC power to a DC power supply and the DC power may be sent to the PPCO circuit to charge the passenger PEDs. In embodiments, each PPCO circuit may manage power to, receive requests from, and charge one passenger PED. The PPCO circuit preferably supports both USB Type A and USB Type C connections to the passenger PED and permits a negotiation of a power contract with the PED, whereby the PED can specifically request a particular power profile, such as a specific voltage value or a specific amperage value.

In some embodiments, the system is configured to independently manage the power supply to one or more passenger cabin zones with each cabin zone having an independent power threshold limiting a power capability setting to each cabin zone independently. For example, a first class seating area may have a higher power capability setting than business class seating. Depending on the number of passengers that the aircraft can carry, the passenger cabin may include one or several PMLD circuits to manage the one or more cabin zones. Advantageously, the system may be scalable in that the PMLD circuit may include several AC/DC conversion circuits connected to the PMLD circuit. Further, each AC/DC conversion circuit may have several PPCO circuits connected to it.

In preferred embodiments, power management may be accomplished by the PMLD circuit continuously monitoring the power demand of all connected passenger PEDs to ensure that the cumulative power demand does not exceed the total pre-defined/predetermined maximum power limit of power reserved for passenger PEDs. In one embodiment, the predetermined maximum power limit per cabin zone is programmed and stored in a configuration plug module (CPM) that is selectively connectable to the PMLD circuit. In a further embodiment, the CPM may be reprogrammable with predetermined maximum power limits corresponding to different passenger aircrafts having different cabin zone configurations and with different amounts of AC power available from its generator(s). Such predetermined maximum power limits from the CPM may be uploaded to the PMLD upon connection and initialization. The PMLD may be configured to ensure that the predetermined maximum power limits are not exceeded by, for example, negotiating power contracts with the connected passenger PEDs according to the power profiles in table 1, herein below, which will be discussed in more detail.

In further embodiments, the PMLD circuit may be configured to dynamically adjust the power limits to passenger PEDs as additional passenger PEDs are connected to the system. In other words, as additional passenger PEDs are connected to the system, the PMLD circuit may negotiate the power contracts (reducing/lowering the power capability settings) with all the connected passenger PEDs to ensure that the maximum power limit is not exceeded by all the connected PEDs. Likewise, as passenger PEDs are disconnected/removed from the system, the PMLD may evaluate the number of connected PEDs as compared to the current power capability setting and, if the cumulative power value from such evaluation is less than the predetermined maximum power limit, the PMLD may renegotiate the power contracts (raising/increasing the power capability settings) for all connected PEDs. Advantageously, such negotiation and re-negotiation of the power capability settings allows the PMLD to provide a continuous power supply to the passenger PEDs, without exceeding the predetermined maximum power limit.

In additional embodiments, each PMLD circuit and each AC/DC conversion circuit is housed within an aircraft grade line replaceable unit (LRU) housing and may thereby be referred to as a PMLD "box" and an AC/DC converter "box," respectively. As is known in the aircraft arts, an LRU is a modular component that streamlines maintenance operations by being stocked and replaced quickly, to avoid service delays. The form factors for LRUs are provided by various industry experts, such as, the ARINC standards, or manufacturer LRU standards, such as Airbus, Boeing, and military standards. Each PMLD box may house one or more PMLD circuits. A single PPCO circuit may be enclosed within a PPCO unit and a PPCO unit may be provided at each passenger seat for charging the passenger's PED and permitting the passenger's PED to negotiate and re-negotiate its power contract with the system.

Figure 1:
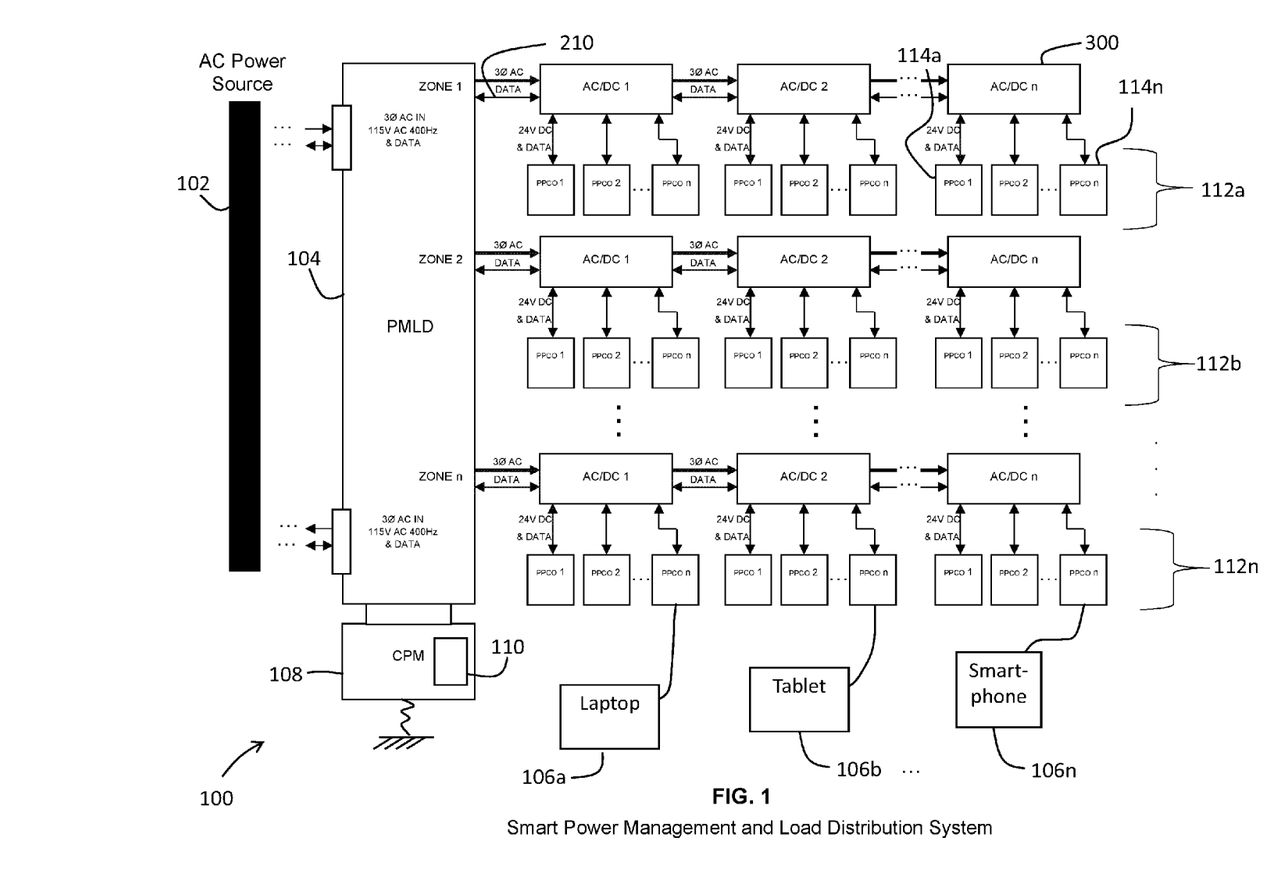
FIG. 1 is a block diagram of a power management and load distribution system, in accordance with an embodiment of the present invention.

Referring now to FIG. 1, one embodiment of the present invention is shown in a block diagram view. FIG. 1 shows several advantageous features of the present invention, but, as will be described below, the invention can be provided in several shapes, sizes, combinations of features and components, and varying numbers and functions of the components. The first example of a smart power management and load distribution system 100, as shown in FIG. 1, includes a source of alternating current (AC) power 102 and a power management and load distribution (PMLD) circuit 104 communicatively coupled to one another. The source of AC power 102 and the PMLD circuit 104 may be disposed within a passenger aircraft to supply power to charge portable personal electronic devices (PEDs) 106*a-n* associated with passengers on the aircraft. The number of PEDs 106*a-n* that can be charged by the system 100 can be any number between "a" and "n." The number of PEDs 106 that can be charged by the system 100 preferably corresponds to the number of passenger seats on the aircraft. In other embodiments, the number of PEDs 106 that can be charged by the system 100 may be less than the number of passenger seats, such as, in aircrafts where only a particular section is provided with USB charging capabilities (e.g., first class seats). The source of AC power 102 is a fixed power supply, such as, for example, an engine-driven generator.

The PMLD circuit 104 can be considered a smart PMLD circuit 104 that is operable to receive the AC power from the source 102 and manage power and load distribution for the passenger PEDs 106 so as to be able to continuously provide an amount of power to charge the PEDs 106, without risking an over-demand condition that would present an unsafe condition.

In one embodiment, the system 100 may include a configuration plug module (CPM) 108 that may be removeably, selectively couplable to the PMLD circuit 104. The CPM 108 may be configured to directly plug into the PMLD circuit 104 and provide initialization data for the PMLD circuit 104. The CPM 108 may store, in a non-transitory memory 110, predetermined maximum power limits for each cabin zone and may be configured with predetermined maximum power limits specific to a particular airplane model or configuration. In one embodiment, the CPM may include a reprogrammable non-transitory memory 110 that may permit reprogramming the CPM with different predetermined maximum power limits. The CPM 108 may upload the predetermined maximum power limits to the PMLD circuit 104 when plugged into the PMLD circuit 104. In one embodiment, the upload from the CPM 108 may overwrite the previous predetermined maximum power limits stored on the PMLD circuit 104 with the new values. Advantageously, some embodiments of the CPM 108 allows the system 100 to be easily reprogrammed with new or different power limits in the field by simply plugging in a different CPM 108, or reprogramming the CPM 108, without requiring any complicated reprogramming of the PMLD circuit 104. In one embodiment, the CPM 108 may be considered a type of plug and play device that is immediately recognized by the PMLD circuit 104 without the need for any physical device configuration or user intervention. In a further embodiment, a software application may be provided to in-the-field technicians that may allow the CPM 108 to be fairly easily reprogrammed with a user-friendly software interface.

For purposes of assigning independent power limits to each area of the aircraft passenger cabin, the aircraft passenger cabin may be considered to be divided into a plurality of cabin zones 112*a-n*, with the predetermined maximum power limit being an indication of a total maximum amount of power permitted for consumption by all PEDs 106 drawing power from the charging outlets disposed within a single cabin zone 112. In other words, power management may be segmented into managing power for each cabin zone 112 independently.

The charging outlets may be considered programmable power capability outlet (PPCO) circuits 114*a-n* that support the negotiation and re-negotiation of power capability between the PEDs 106 and the system 100, as will be discussed in more detail herein below. The number of PPCO circuits 114 within the system can be any number between "a" through "n. The number of PPCO circuits 114 within the system 100 preferably corresponds to the number of passenger seats on the aircraft, but may be more or less in alternative embodiments. The number of cabin zones 112 can also be any number between "a" and "n," and may be dependent on the size and configuration of the aircraft. For example, for smaller aircraft, there may be only one cabin zone 112, while in larger aircraft, such as the Boeing 747-400, there may be a multitude of cabin zones to support supplying DC power to potentially hundreds of passenger PEDs 106.

Figure 2:
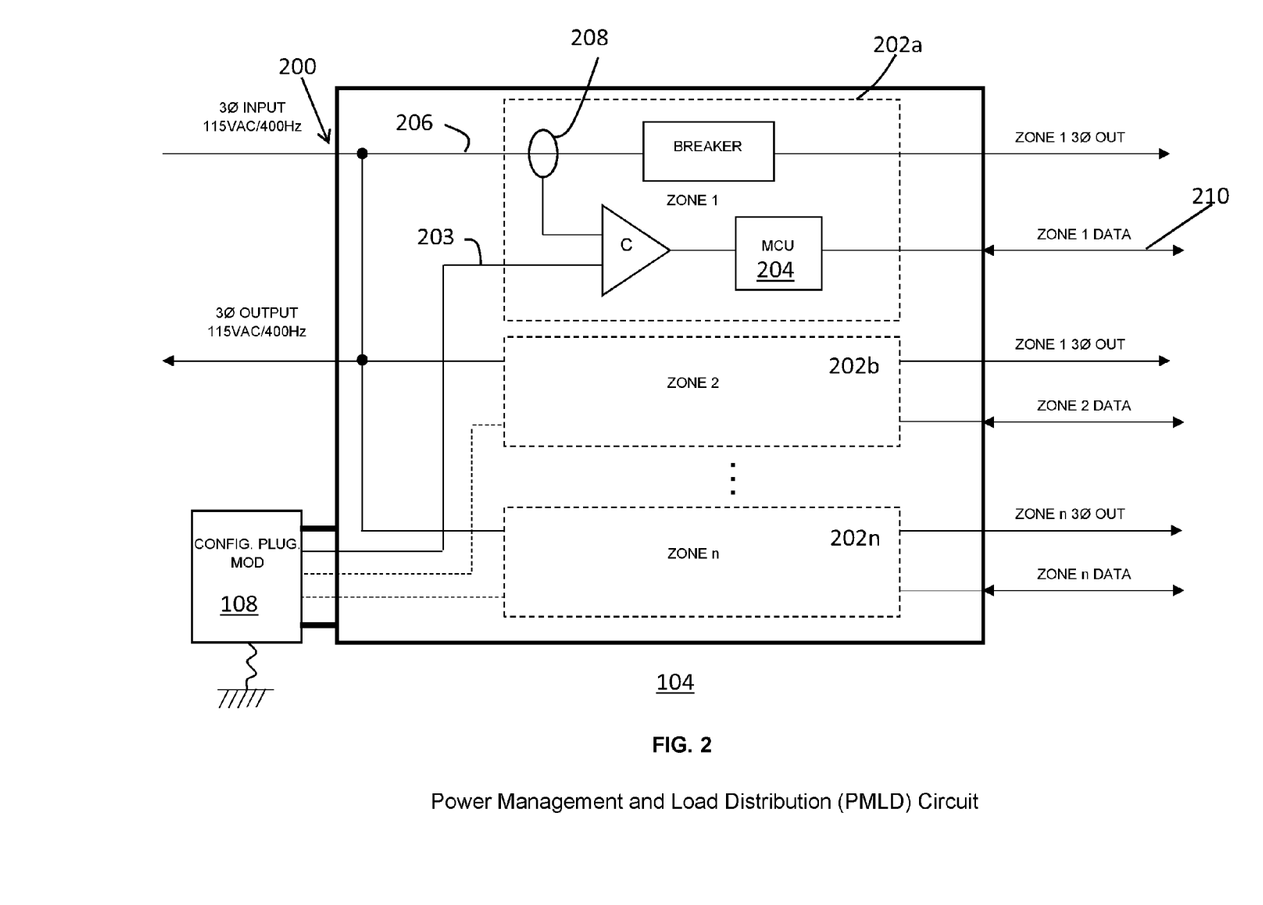
FIG. 2 is a block diagram of a power management and load distribution (PMLD) circuit in the system of FIG. 1, in accordance with an embodiment of the present invention.

Referring now primarily to FIG. 2, with reference to FIG. 2, the PMLD circuit 104 will be described with reference to the circuit diagram. In one embodiment, the PMLD circuit 104 accepts power from the AC source 102, via a power input 200, in a single or three phases Delta or Wye connection to supply power to at least one cabin zone 112. The PMLD circuit 104 may be organized into a plurality of zone modules 202*a-n*, where one zone module 202 is configured to manage power for one cabin zone 112. In other words, each of the plurality of zone modules 202*a-n* may manage power and data for a corresponding one of the plurality of cabin zones 112, as shown in FIG. 2. The number of zone modules 202 can be any number between "a" and "n." In a preferred embodiment, the number of zone modules 202 should correspond to the number of cabin zones 112 in the aircraft. In an embodiment with only one cabin zone 112 in the aircraft, there may only be one zone module 202 operable within the PMLD circuit 104.

Each zone module 202 may include at least one microcontroller unit 204 in addition to other electrical components that support power management to the cabin zone 112. As is known in the art, microcontroller units (MCUs) are typically small computers on a single integrated circuit. MCUs conventionally include one or more CPUs (processor cores) in addition to memory and programmable input/output (i/o) peripherals. MCUs that may be included in embodiments of the present invention are provided by manufacturers such as Texas Instruments and Amtel.

The zone module 202 may be configured to receive the predetermined maximum power limit specific to the respective cabin zone 112 that it manages. The predetermined maximum power limit may be sent from the CPM 108, over a data line 203, and the AC power may be sent from the source 102, over a power line 206, as shown in FIG. 2. The zone module 202 may continuously monitor a power output to the respective cabin zone 112 that it manages. In one embodiment, the microcontroller unit 204 may continuously monitor the current per phase as well as the voltages. For example, the zone module 202 may include a current sense 208 that senses current flow on the power line 206 and communicates the presence of current to the microcontroller unit 204. The current sense 208 can be direct or indirect. Indirect current sensing is based on Ampere's and Faraday's laws. By placing a coil (for instance a Rogowski coil) around a current-carrying conductor, a voltage is induced across the coil that is proportional to the current. This allows for a non-invasive measurement where the current sense 208 circuitry is not electrically connected to the monitored system. Since there is no direct connection between the current sense 208 circuitry and the system, the system is inherently isolated. For direct current sensing, a shunt resistor is placed in series with the system load so that a voltage is generated across the shunt resistor that is proportional to the system load current. The voltage across the shunt can be measured by differential amplifiers such as current shunt monitors (CSMs), operational amplifiers (op amps), difference amplifiers (DAs), or instrumentation amplifiers (IAs). This method is an invasive measurement of the current since the shunt resistor and sensing circuitry are electrically connected to the monitored system.

The microcontroller unit 204 may be operably configured to continuously compare the measured power output of the respective cabin zone 112 to the predetermined maximum power limit of the respective cabin zone 112. As used herein, the term "continuously" in intended broadly to encompass absolutely continuous monitoring, as well as, periodic monitoring and comparing at predetermined time intervals. To elaborate, the term "continuously" is intended to encompass the microcontroller unit 204 periodically at specified time intervals (e.g., 1 second, 1 minute, etc.) comparing the power output to the predetermined maximum power limit.

The microcontroller unit 204 may also be configured to determine or assign a power capability setting based on such comparison (of the power output to the predetermined maximum power limit). The power capability setting may be considered an indication of a maximum amount of power permitted for consumption by any PEDs 106 connected to the system 100 within the respective cabin zone 112. In other words, whereas the predetermined maximum power limit indicates the total maximum amount of power allotted to a cabin zone 112, the power capability setting is intended to be broadcast to the PED 106 and therefore indicates to the PED 106 its maximum power limit. Accordingly, the zone module 202 may be configured to receive data indicating a number of PEDs 106 currently connected to PPCO circuits 114 with its respective cabin zone 112 for purposes of calculating how much power can be safely consumed by each PED 106. Such data indicating the current number of connected PEDs 106 may be received by the microcontroller unit 204 over a data line 210.

In one embodiment, the microcontroller unit 204 within the zone module 202 may be configured to continuously increase or decrease to a non-zero value (i.e., not deny power) the power capability setting based on a comparison of the measured power output to the predetermined maximum power limit for the respective cabin zone 112. In a further embodiment, the microcontroller unit 204 may be operably configured to adjust the power capability setting upwards and downwards in wattage value depending on the predetermined maximum power limit for the respective cabin zone 112 and the number of PEDs 106 currently connected to the system 100 in the respective cabin zone 112. In one embodiment, the zone module 202 is operably configured to decrease to a non-zero value (i.e., not deny power) the power capability setting as a result of the microcontroller unit 204 determining that the measured power output reaches or exceeds the predetermined maximum power limit for the respective zone 112. In a further embodiment, the zone module 202 may be operably configured to increase the power capability setting as a result of the microcontroller unit 204 determining that the measured power output is less than the predetermined maximum power limit for the respective zone 112. Advantageously, PEDs 106 can consume more power when more power is available (e.g., less PEDs are connected) and consume less power when the power output is reaching potentially unsafe conditions. In such manner, the present invention distributes power efficiently and dynamically to provide PEDs 106 with a constant supply of power (i.e., not disabling power), while also preventing unsafe conditions.

In one embodiment, the power capability setting may be calculated and continuously recalculated by comparing the number of connected PEDs 106 to the predetermined maximum power limit to determine an amount of power that each of the PEDs can consume without exceeding the predetermined maximum power limit. Stated yet another way, the PMLD circuit 104 may be operably configured to continuously adjust (upward and downward) the power capability setting value broadcast to connected PEDs 106 based on whether the power output to the cabin zones 112 reaches or exceeds the predetermined maximum power limit for the cabin zones 112. In such embodiments, the PMLD circuit 104 should continuously monitor power output to each of the cabin zones 112 and the number of connected PEDs 106 in the cabin zones 112. In one embodiment, each zone module 202 (or more particularly the microcontroller unit 204) may send the power capability settings to the PEDs 106 within its cabin zone 112 over the data line 210 and may also receive the indication of the number of connected PEDs 106 over the data line 210.

In one embodiment, the microcontroller unit 204 may perform certain calculations to ensure that the power output does not exceed the predetermined maximum power limit and/or to increase the power availability to PEDs 106 where appropriate (e.g., when less PEDs are connected). As an example, cabin zone 1 may have a predetermined maximum power limit of 8 kW, the number of connected PEDs 106 within cabin zone 1 may be 220, and the current power capability setting may be 36 W. The microcontroller unit 204 may multiply the number of connected PEDs (at t=1), $N_1$, and the current power capability setting (at t=1), $P_1$, resulting in a value of 7,920 W, which is less than 8 kW. Subsequently, the microcontroller unit 204 may determine that the number of connected PEDs (at t=2), $N_2$, is reduced to 130. The microcontroller unit 204 may be configured to determine that a reduction in connected PEDs 106 has occurred and may calculate a new $P_2$ value for the power capability setting by, for example, dividing the predetermined maximum power limit, L, by $N_2$ (8 kW/130=61.53 W). The microcontroller unit 204 may identify a pre-stored, predetermined power capability setting, such as those stored in table 1 herein below, closest to the resulting value of 61.53 W, rounding down, so as not to exceed L. Accordingly, the new power capability setting $P_2$ may be 60 W, which the microcontroller unit 204 would broadcast to the PEDs 106, to notify the PEDs 106 that they may consume more power (because less devices are connected).

In alternative embodiments, the microcontroller unit 204 may incrementally increase the power capability setting for each new PED disconnection in the cabin zone 112. In yet other embodiments, other methods of calculation and adjustment may be performed but should generally increase or decrease the power capability setting broadcast to connected PEDs 106 according to a comparison of the predetermined maximum power limit to the power output and/or the number of connected PEDs 106.

The PMLD circuit 104 may be enclosed in an LRU housing and may be considered a PMLD box 104. The LUR housing may provide thermal protection breakers to protect against short circuits. In a further embodiment, the PMLD box 104 may also include input power pass-thru (output) capability so as to support embodiments where more than one PMLD box 104 may be connected within the system 100 to cover a very large number of seats across multiple cabin zones 112. The CPM 108 may provide all the settings for the predetermined maximum power limits per cabin zone 112.

Figure 3:
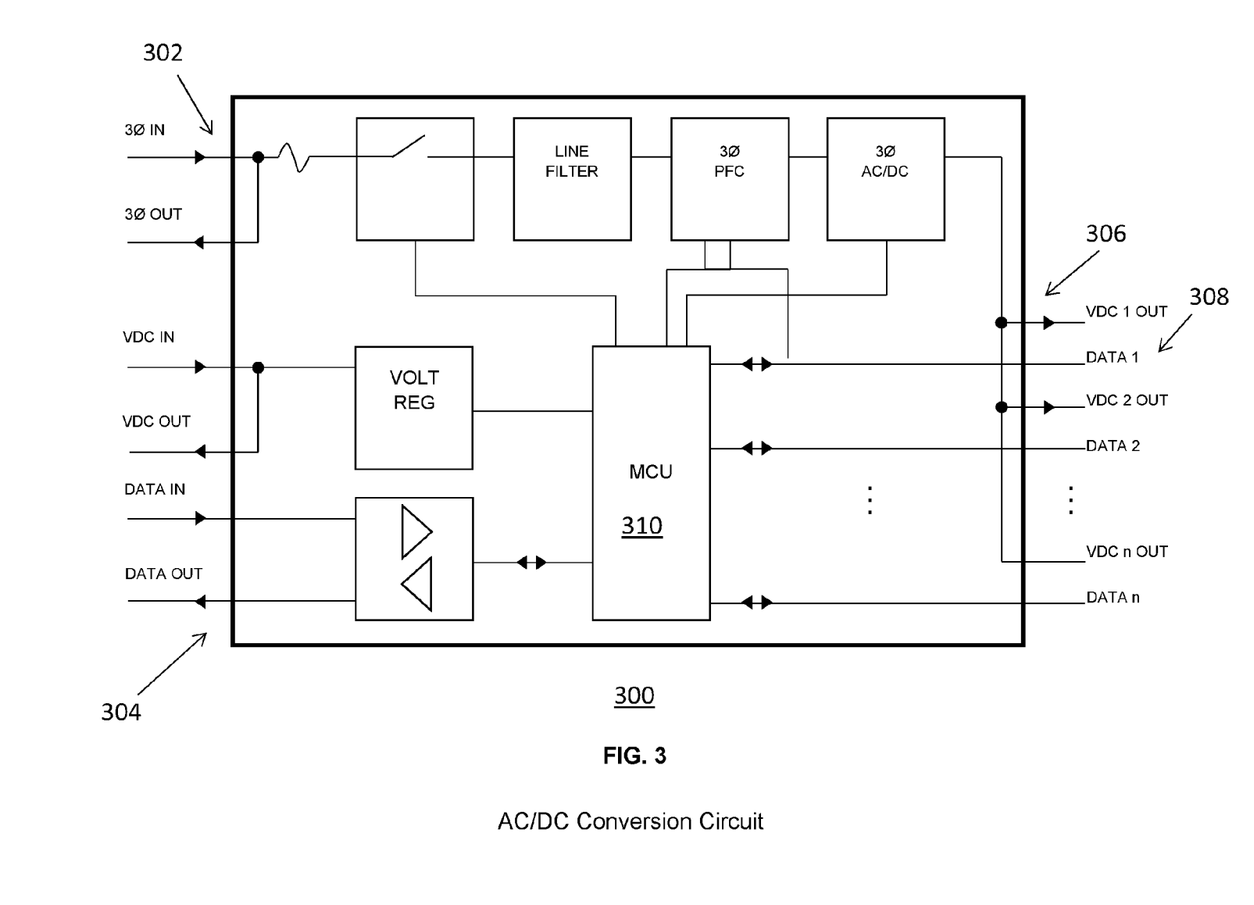
FIG. 3 is a block diagram of an AC/DC conversion circuit in the system of FIG. 1, in accordance with an embodiment of the present invention.

Referring now primarily to FIG. 3, with reference to FIG. 1, an exemplary embodiment AC/DC conversion circuit 300 will be described with reference to the circuit diagram. One or more AC/DC conversion circuits 300 may be connected to the PMLD circuit 104, as shown in FIG. 1, for receiving AC power (via a power input/output ("i/o") 302) and data from the PMLD circuit 104 (via a data i/o 304). The AC/DC conversion circuit 300 may convert 115 V, 400 Hz AC power into an isolated DC power. In a preferred embodiment, the voltage for the DC power is larger than 20 V (e.g., 24 $V_{dc}$).

In one embodiment, a plurality of AC/DC conversion circuits 300 may be connected together in a daisy chain configuration, as shown in FIG. 1. The plurality of AC/DC conversion circuits 300 may be electrically coupled to the PMLD circuit 104 and may be connected together in series in the daisy chain configuration with at least one power line and at least one data line between each of the plurality of daisy chained AC/DC conversion circuits 300. The power and data lines between the daisy chained AC/DC conversion circuits 300 may permit power and data (e.g., power capability setting and attach detection input signals) to be transmitted between the PMLD circuit 104 and each of the AC/DC conversion circuits 300 in the cabin zone 112. The AC/DC conversion circuits 300 may receive the power capability settings from the PMLD circuit 104 and broadcast it to the PPCO circuits 114 and may receive the attach detection input signal from the PPCO circuits 114 and send it to the PMLD circuit 104.

The number of AC/DC conversion circuits 300 required for each cabin zone 112 may be a function of the aircraft cabin configuration (i.e., the number of passenger seats) in that zone 112. Each AC/DC conversion circuit 300 may be configured to connect to one or more PPCO units 114. The number of PPCO units 114 per AC/DC conversion circuit 300 may also be a function of the number of passenger seats within the respective cabin zone 112.

In one embodiment, the AC/DC conversion circuit 300 may provide the following to the PPCO circuits 114 that it is connected to: 1) DC power (via a DC power i/o 306); and 2) data (via a data i/o 308) indicating the power capability setting from the zone module 202 responsible for managing its zone 112. Referring now specifically to FIG. 3, the $V_{DC1}$ out and Data 1 out lines represent DC power and data lines, respectively, to PPCO 1; the $V_{DC2}$ out and Data 2 out lines represent DC power and data lines, respectively to PPCO 2; and the $V_{DCn}$ out and Data n lines represent DC power and data lines, respectively to PPCO N (see FIGS. 3 and 1).

The term "input/output" or "i/o" may be used to describe communication points herein; however, it should be understood that some embodiments of the "i/o" may not provide bi-directional communication and may instead transmit data or power in only a single direction, where appropriate. For example, $V_{DC1}$ out is identified herein as the DC power i/o 306 but may actually be embodied as a power source (and not a power sink), as indicated by the single direction arrow in the exemplary circuit diagram. However, in alternative embodiments, the communication point 306 may be configured to receive power, as well as send it. Similarly, Data 1, identified herein as the data i/o 308, is configured to send, as well as receive data, as indicated by the dual-direction arrows in the exemplary circuit diagram.

The AC/DC conversion circuit 300 may receive data messages from and send data messages to the PMLD circuit 104 through an RS-485 bidirectional communication channel 210. The AC/DC conversion circuit 300 may additionally receive data messages from the PPCO circuit 114, via the data i/o 308. The data message from the PPCO circuit 114 may be the attached detector input signal from the PPCO circuit 114 indicating that a PED 106 has been detected to have connected to the PPCO circuit 114. This attach detector input signal may then be transmitted from the AC/DC conversion circuit 300 to the PMLD circuit 104 via the data i/o 304. In a preferred embodiment, the data i/o 304, 308 between the PPCO circuit 114, the AC/DC conversion circuits 300, and the PMLD circuit 104 are bidirectional communication channels so that messages may be transmitted in either direction in order to pass information along the system 100 from the PMLD circuit 104 (responsible for continuously adjusting the power capability settings) and the PPCO circuits 114 (capable of detecting PED 106 connections and disconnections and transmitting the power capability settings to the PEDs 106).

The AC/DC conversion circuit 300 may include a microcontroller unit 310 in addition to other components supporting the transmission and conversion of power and data by the circuit 300, as should be apparent to one of ordinary skill in the art from the circuit diagram. In one embodiment, the microcontroller unit 310 receives a new power capability setting from the PMLD circuit 104 and may convert the message into a fixed frequency, which is sent to the PPCO circuit 114 over the data line (e.g., Data 1) coming out of the bidirectional data i/o 308. In one embodiment, the fixed frequency may be in the form of a pulse width modulation (PWM) frequency signal. The PWM frequency may be varied based on the commanded power capability setting from the PMLD circuit 104, from 25 Hz equivalent to 2.5 W and up to 1 KHz equivalent to 100 W, to be advertised to the PEDs 106 through the PPCO circuit 114. The microcontroller unit 310 may be configured to store, in a non-transitory memory, a plurality of PWM frequencies (each different from one another) corresponding to a plurality of pre-stored, predetermined power capability settings (each different from one another). The microcontroller unit 310 may be configured to receive and interpret the power capability setting from the PMLD circuit 104, determine the corresponding PWM frequency, and transmit the corresponding PWM frequency to the PPCO circuit(s) 114. Techniques for creating and transmitting a PWM frequency from an MCU are known in the art and will therefore not be described herein in detail.

It should be understood that communications between the circuits discussed herein may be accomplished over a hard wire electrical line (e.g., RS-485) in some embodiments, and may, in other embodiments, be transmitted wirelessly via, for example, an RF transceiver. As is known in the art, most MCU's include at least one RF transceiver for wireless communications. Likewise, it should also be understood that the terms "input/output" and "i/o" may indicate a hard wired input and/or output connection port, or, alternatively, in some embodiments, a wireless communication point, such as an antenna operable to send and/or receive data wirelessly.

Figure 4:
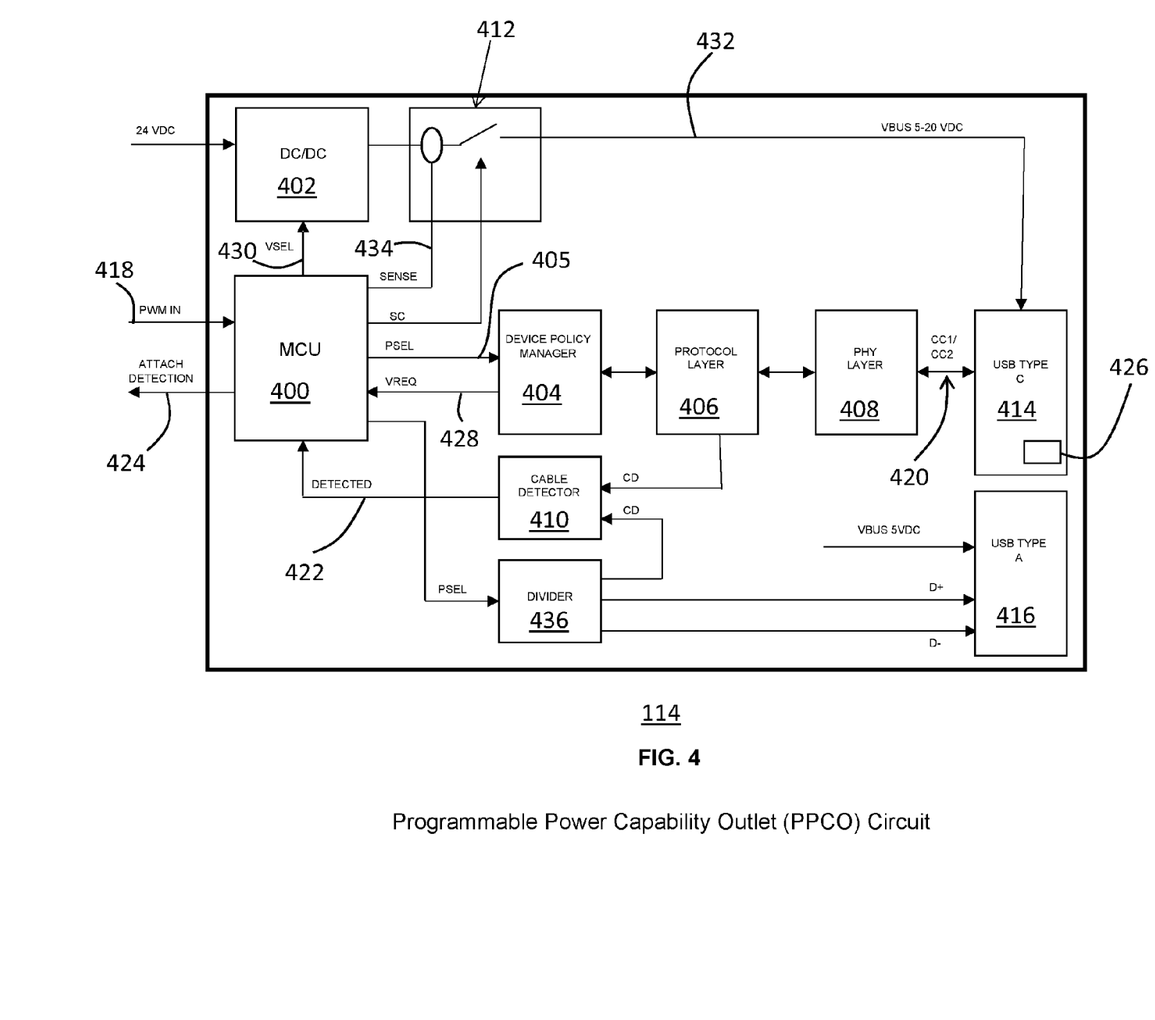
FIG. 4 is a block diagram of a programmable power capability outlet (PPCO) circuit in the system of FIG. 1, in accordance with an embodiment of the present invention.

Referring now primarily to FIG. 4, with reference to FIG. 1, an exemplary embodiment PPCO circuit 114 will be described with reference to the provided circuit diagram. The PPCO circuit 114 may be communicatively coupled to an AC/DC conversion circuit 300 dedicated to the respective cabin zone 112. The PPCO circuit 114 may include a microcontroller unit 400, a DC/DC converter 402, a device policy manager 404, a protocol layer 406, a physical layer 408, a cable detector 410, and a current sense circuit 412. The PPCO circuit 114 further includes at least one USB connector. In a preferred embodiment, the PPCO circuit 114 includes a USB Type C connector 414 and a USB Type A connector 416. The USB Type C connector 414 should include USB-PD capability to enable high power charging of up to 100 W.

Each of the PPCO circuits 114 may be disposed on or proximate a passenger seat within the passenger cabin. In other words, the PPCO circuit 114 should be disposed within a standard USB cable range of the corresponding passenger seat to allow the passenger to charge his/her PED 106 while seated in his/her seat. In one embodiment, the PPCO circuit 114 may be integrated into a backseat facing the passenger's seat. In another embodiment, the PPCO circuit 114 may be integrated into an arm rest of the passenger's seat. In yet other embodiments, the PPCO circuit 114 may be disposed on other areas within cable charging range of the passenger seat.

In one embodiment, the microcontroller unit 400 receives the PWM frequency signal 418 from the AC/DC conversion circuit 300 and converts the PWM frequency 418 into a power profile corresponding to one of a plurality of pre-stored, predetermined power profiles, such as those indicated by table 1 herein immediately below.

TABLE 1

List of Exemplary Power Capability Settings and Corresponding Power Contract Negotiation Capabilities.

Samples of Power Contract Capabilities: 2.5 W to 100 W

| | | | | | |
|---|---|---|---|---|---|
| 2.5 W | 5 V @ 500 mA | | | | |
| 5 W | 5 V @ 900 mA/1 A | | | | |
| 7.5 W | 5 V @ 1.5 A | | | | |
| 10.5 W | 5 V @ 2.1 A | | | | |
| 15 W | 5 V @ 3 A | | | | |
| 18 W | 5 V @ 3.6 A | 9 V @ 2 A | 12 V @ 1.5 A | 15 V @ 1.2 A | 20 V @ 0.9 A |
| 23 W | 5 V @ 4.5 A | 9 V @ 2.5 A | 12 V @ 1.87 A | 15 V @ 1.5 A | 20 V @ 1.12 A |
| 25 W | 5 V @ 5 A | | | | |
| 33 W | | 9 V @ 3.61 A | 12 V @ 2.7 A | 15 V @ 2.17 A | 20 V @ 1.62 A |
| 36 W | | 9 V @ 4 A | 12 V @ 3 A | 15 V @ 2.4 A | 20 V @ 1.8 A |
| 40 W | | 9 V @ 4.5 A | | | |
| 45 W | | 9 V @ 5 A | 12 V @ 3.74 A | 15 V @ 3 A | |
| 47 W | | | | 15 V @ 3.1 A | 20 V @ 2.32 A |
| 50 W | | | 12 V @ 4.16 A | | |
| 60 W | | | 12 V @ 5 A | | 20 V @ 3 A |
| 65 W | | | | 15 V @ 4.34 A | 20 V @ 3.24 A |
| 75 W | | | | 15 V @ 5 A | |
| 92 W | | | | | 20 V @ 4.64 A |
| 100 W | | | | | 20 V @ 5 A |

The microcontroller unit 400 may send the power profile to the device policy manager 404 over the $P_{SEL}$ line 405 and therefore should convert the PWM frequency signal 418 into a power profile understandable by the device policy manager 404.

The first column of table 1 indicates a plurality of pre-stored, predetermined power capability settings that may be permitted by the system 100. The following five columns of table 1 lists the pre-stored, predetermined power profile(s) that may be available for negotiation between the PED 106 and the system 100 for each of the power capability settings. For example, the power capability setting of 45 W provides for at least three (3) different power profiles: 9V @ 5 A, 12V @ 3.74 A, and 15V @ 3 A, as is apparent from table 1. Accordingly, at a 45 W power capability setting for the zone 112, connected PEDs 106 may request, negotiate, and re-negotiate for one of the three available power profiles.

The device policy manager 404 may include information about the PPCO circuit 114 and the system 100, such as the capabilities for providing power. As is generally known in the USB connection arts, the protocol layer 406 is responsible for forming the power capability messages used to communicate with the PED 106 and the physical layer 408 is responsible for sending and receiving messages across the CC lines 420, using for example Bi-phase Mark Code (BMC).

The microcontroller unit 400 may be configured to detect if a PED 106 is attached to the USB Type C connector 414 from the cable detector 410, which reports a detection event over a detection line 422. The microcontroller unit 400 may report the attach detection event over the attach detection line 424. The attach detection event may be reported to the PMLD circuit 104 by passing the data through the AC/DC conversion circuit (over data line 308) and to the PMLD circuit 104 (over data line 210) so that the PMLD circuit 104 can monitor the number of PEDs 106 connected to the system 100. Data indicating a PED detachment/disconnection event may also be transmitted along the same lines as the attach detection event so that the PMLD circuit 104 can recalculate the power capability setting for a reduced number of connected PEDs 106.

The configuration, specification, and parameters for a USB Type C connector 414 are known in the art and therefore will not be discussed in great detail herein. Pin configurations and other physical and electrical specifications for USB Type C connectors can be found in publicly available documents through the USB Implementers Forum.

The USB Type C connector 414 in accordance with the present invention should also support USB-PD to provide for high power charging for higher power consuming devices such as laptops. In one embodiment, the USB Type C connector 414 may be configured with an output power range of at least 2.5 W to 100 W. The PPCO circuit 114 may therefore include a USB-PD power port controller 426, which provides the physical layer (PHY) functionality of the USB-PD protocol. USB-PD power port controllers are available by several well-known manufacturers, such as Texas Instruments. The USB-PD data is output through either the C-CC1 line or the C-CC2 line 420, depending on the reversible USB Type C cable. The power capability settings message formatted by the protocol layer and the physical layer for transmission to the PED 106 is sent across the C-CC1 or C-CC2 line 420. The power capability setting should indicate an output power capability of between at least 0.5 to 100 W and may force a new negotiation with the PED 106.

Once a new power contract is engaged for a particular power level, under the USB-PD specification, the USB-PD enabled PED 106 connected to the USB Type C connector 414 can request for higher voltages than 5 V, via the $V_{REQ}$ line 428 to the microcontroller unit 400. Stated another way the $V_{REQ}$ line 428 may connect the device policy manager 404 to the microcontroller unit 400 and may be operably configured to transmit a voltage change request from the connected PED 106 to the PPCO circuit 114 as part of the negotiation of the power contract. The microcontroller unit 400 may acknowledge the voltage change request and set up the variable output DC/DC converter 402 to change the voltage through the $V_{SEL}$ line 430. Voltage is transmitted to the USB Type C connector 414 over the $V_{BUS}$ line 432. In other words, the $V_{SEL}$ line 430 may be operably configured to transmit the command from the microcontroller unit 400 to the DC/DC converter 402 to change the DC voltage of the DC power supplied to the PED 106, according to the voltage change request.

The microcontroller unit 400 may also be configured to program the current sense circuit 412, over the current sense line 434, with the current limits established for the negotiated power capability contract. In one embodiment, the power capability contract negotiation may include the PED 106 requesting a voltage change over the $V_{REQ}$ line 428; the microcontroller unit 400 identifying whether the requested voltage is within one of the power profiles available for the current power capability setting (see table 1); the microcontroller unit 400 identifying a corresponding amperage value that does not exceed the power capability setting (see table 1); the microcontroller unit 400 acknowledging to the PED 106 acceptance of the voltage change request; and the microcontroller unit 400 commanding the DC/DC converter 402 to change the voltage and the current sense circuit 412 to change the amperage value in accordance with the power contract.

As an example, the PED 106 may be in a condition of receiving a DC power profile of 9V @ 5 A and may subsequently request a DC voltage of 12V. The microcontroller unit 400, responsive to the request, may determine that the current power capability setting is 45 W and that at such power capability setting, the power profile available at 12V requires 3.74 A. The microcontroller unit 400 may acknowledge the voltage request from the PED 106 and may command the DC/DC converter 402 and the current sense circuit 412 to adjust the DC power to 12V@ 3.74 A. Other types of negotiations for power profiles between the PED 106 and the PPCO circuit 114 are also contemplated, such as, for example, an amperage value change request from the PED 106, etc. Importantly, the PPCO circuit 114 ensures that the power output over the $V_{BUS}$ line 432 does not exceed the power capability setting from the PMLD circuit 104. The hereinabove negotiations assume that the PED 106 is supported for the USB-PD protocol.

In an embodiment where a PED 106 that does not support the USB-PD protocol is connected to the USB Type C connector 414, the DC/DC converter 402 may be configured to output a safe 5V on the $V_{BUS}$ 432 and the C_CC1 line and/or C_CC2 line 420 may advertise the current power capability to the PED 106 as one of the standard USB modes (500 mA, 900 mA, 1.5 A or 3.0 A), depending on the total available power for the cabin zone 112.

In an embodiment where the PED 106 is connected to the USB Type A connector 416, the programmable power capabilities may be accomplished by setting the voltages on the D+ and D− data lines from the divider 436. The divider 1 for 5 W capabilities may be accomplished by applying 2V to the D+ line and 2.7V to the D− data line. The divider 2 for 10 W capabilities may be accomplished by applying 2.7V on the D+ line and 2V on the D− line. The divider 3 for 12 W capabilities may be accomplished by applying 2.7V on the D+ and D− lines.

Figure 5:
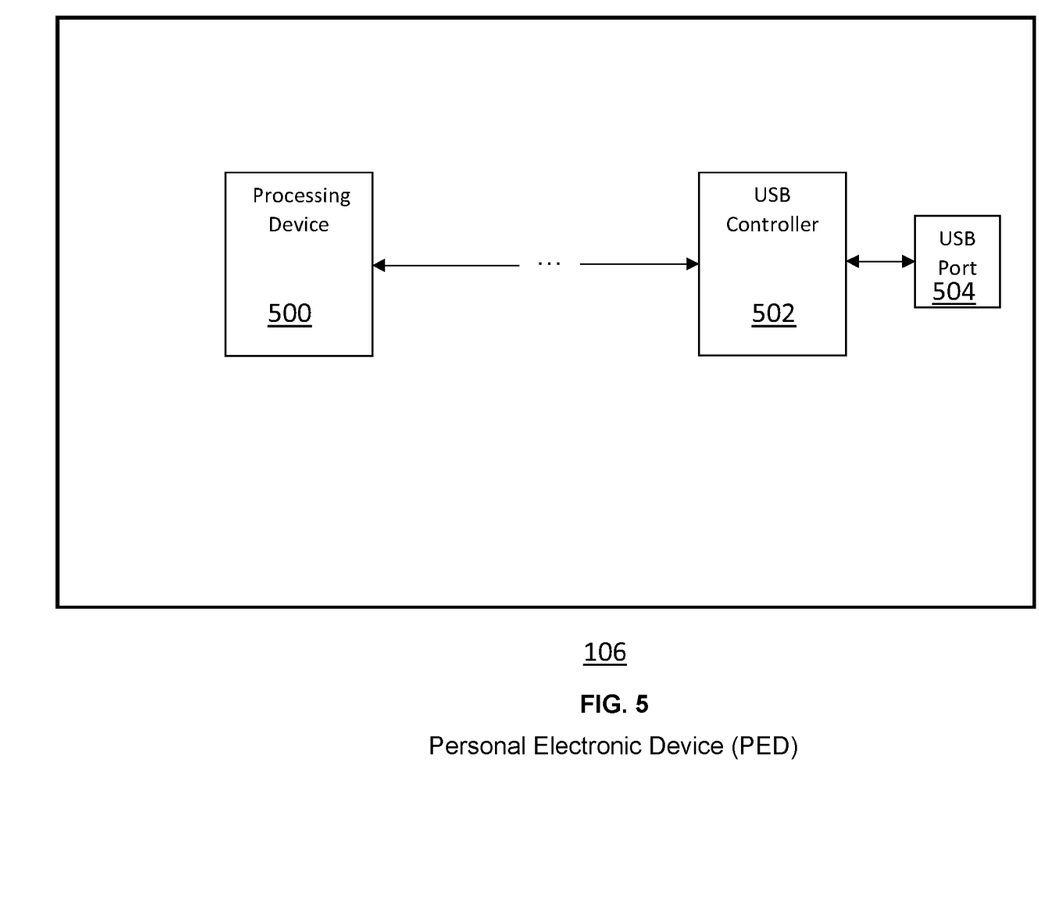
FIG. 5 is a block diagram of an exemplary portable personal electronic device (PED) consuming power through connection to the PPCO circuit of FIG. 1, in accordance with the present invention.

Referring now primarily to FIG. 5, a block diagram is depicted illustrating an exemplary PED 106 in accordance with embodiments of the present invention. The PED 106 may be a laptop, a tablet, a smart phone, and the like, which configurations are generally known in the art and therefore will not be described in great detail herein. The PEDs 106 connected to the system 100 should include at least a processing device 500, a USB controller 502, and a USB port 504, which should be apparent from the hereinabove description of the system 100. Preferably, the PED 106 supports the USB-PD specification and may also include a USB-PD power port controller.

Figure 6:
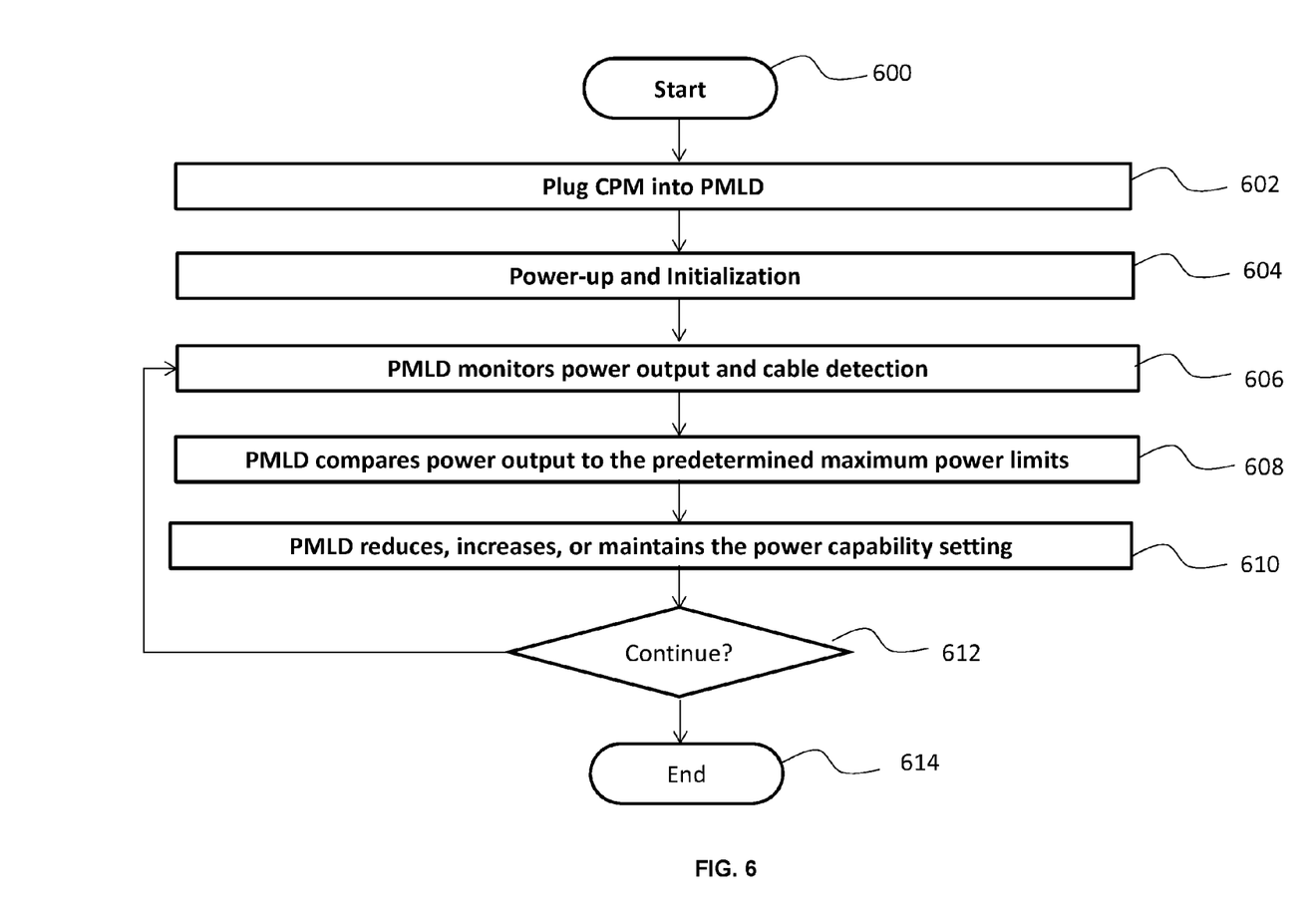
FIG. 6 is a flow chart depicting an exemplary process of utilizing the system of FIG. 1 to charge passenger PEDs, in accordance with an exemplary embodiment of the present invention.

The process flow chart of FIG. 6 will now be described in conjunction with the circuit/block diagrams of FIGS. 1-5. Although FIG. 6 shows a specific order of executing the process steps, the order of executing the steps may be changed relative to the order shown in certain embodiments. Also, two or more blocks shown in succession may be executed concurrently or with partial concurrence in some embodiments. Certain steps may also be omitted in FIG. 6 for the sake of brevity.

The exemplary process may begin at step 600 and may immediately proceed to step 602, where the CPM 108 may be plugged into the PMLD circuit 104. As discussed herein above, the CPM 108 may provide the predetermined maximum power limits for each of the cabin zones 112 to the PMLD circuit 104. In step 604, the system 100 may enter an initial power-up phase where the system 100 is initialized. On the initial power-up, the PMLD circuit 104 may broadcast to the plurality of AC/DC conversion circuits 300 connected within its cabin zones 112 a default power capability setting, such as, for example 60 W per PPCO circuit 114.

In step 606, as passengers begin plugging in their PEDs 106 to the PPCO circuits 114 at their seats, the PMLD circuit 104 monitors the power output of each cabin zone 112 and the number of PEDs 106 connected to the PPCO circuits 114 in each cabin zone 112 (as described herein above). In step 608, the PMLD circuit 104 compares the power output for each cabin zone 112 to the corresponding predetermined maximum power limit for the respective cabin zone 112. For example, the predetermined maximum power limit for cabin zone 1 may be 8 kW. The PMLD circuit 104 will continuously monitor power output for each zone 112 and continuously compare the predetermined maximum power limit for each zone 112 to the measured power output.

In step 610, the PMLD circuit 104 may determine whether to increase, decrease, or maintain the power capability setting for each zone 112, depending on the comparison. In one embodiment, if the predetermined power limit for a particular zone 112 (e.g., zone 1) is reached (or exceeded) a new message will be broadcast from the microcontroller unit 204 of the zone module 202 for that zone 112 to reduce the power capability setting for all PPCO circuits 114 within the zone 112 (e.g., zone 1). On the other hand, if the predetermined power limit for a particular zone 112 is not reached (or exceed) the power capability settings for all PPCO circuits 114 within the zone 112 are maintained.

In one embodiment, if the measured power output continues to exceed the predetermined maximum power limit for a zone 112, the microcontroller unit 204 for the zone 112 may broadcast yet another message to further reduce the power capability setting from, for example, 60 W to 50 W, and again, from 50 W to 45 W, per PPCO circuit 114, etc. until the predetermined maximum power limit for the zone 112 is no longer exceeded.

On the other hand, to take advantage of the maximum power available in the cabin zone 112, the PMLD circuit 104 may utilize the count of the number of connected PEDs 106 to increase the power capability setting, should one or more PEDs 106 be disconnected from the system 100. As explained herein above, the PPCO circuit 114 may be configured to detect when a PED 106 is attached and when the PED 106 is disconnected from the PPCO circuit 114. The attach detection signal may be transmitted to the microcontroller unit 204 of the PMLD circuit 104 for that zone 112 so that the microcontroller unit 204 can increase the power capability setting in a safe and efficient manner (e.g., when less PEDs are consuming power). Stated another way, the power capability setting may be increased for a particular cabin zone 112 as a result of the microcontroller unit 204 in the zone module 202 determining that the number of connected EDs 106 in the corresponding cabin zone 112 was reduced (i.e., one or more PEDs 106 disconnected from the USB port).

In step 612, the process may continue to step 606, where steps 606, 608, and 610 may be repeated so as to permit the PMLD circuit 104 to continuously monitor power output and cable detection, and perform a dynamic adjustment of the power capability settings so as to efficiently manage power output, without exceeding the predetermined maximum power limits for each zone 112. The process may end at step 614.

A novel and efficient power management and load distribution system has been disclosed that dynamically and efficiently manages power and load distribution. Preferred embodiments of the present invention are configured to continuously (uninterrupted) provide power for passenger PEDs. Embodiments of the present invention include a PMLD circuit configured to dynamically adjust the power limits to passenger PEDs as additional passenger PEDs are connected and disconnected to the system. In other words, as additional passenger PEDs are connected to the system, the PMLD circuit may negotiate the power contracts (reducing/lowering the power capability settings) with all the connected passenger PEDs to ensure that the maximum power limit is not exceeded. Likewise, as passenger PEDs are disconnected/removed from the system, the PMLD may evaluate the number of connected PEDs as compared to the current power capability and, if the cumulative power value from such evaluation is less than the predetermined maximum power limit, the PMLD may renegotiate the power contracts (raising/increasing the power capability settings) for all connected PEDs. Advantageously, such negotiation and re-negotiation of the power capability settings allows the PMLD to provide a continuous power supply to the passenger PEDs, without exceeding the predetermined maximum power limit.

It should be understand that although the preferred embodiment of the present invention is configured to charge PEDs for passengers on a passenger aircraft, in other embodiments of the present invention, the system may be configured to intelligently and efficiently charge PEDs for passengers on other mass transport vehicles with a limited power supply, such as, for example, a train or a bus.

What is claimed is:

1. A power management and load distribution system comprising:
   a source of alternating current (AC) power within an airplane;
   a power management and load distribution (PMLD) circuit within the airplane and coupled to the source, the PMLD circuit:
      having at least one predetermined maximum power limit; and
      operably configured to continuously measure a power output from the PMLD circuit, and at least one of increase and decrease to a non-zero value a power capability setting based on a comparison of the measured power output to the at least one predetermined maximum power limit;
   at least one AC/DC conversion circuit communicatively coupled to the PMLD circuit and operable to convert the AC power into a DC power for supplying the DC power to at least one personal electronic device (PED) associated with a passenger of the airplane; and
   at least one programmable power capability outlet (PPCO) circuit communicatively coupled to the at least one AC/DC conversion circuit, the at least one PPCO circuit:
      operably configured to receive the DC power and the power capability setting;
      including at least one USB connector selectively couplable to the at least one PED associated with the passenger of the airplane;
      operable to charge the PED coupled to the at least one USB connector at an amount of DC power indicated by the power capability setting; and
      operably configured to negotiate a power contract with the PED to change at least one of a DC amperage and a DC voltage of the DC power supplied to the PED.

2. The system in accordance with claim 1, wherein:
the PMLD circuit is operably configured to decrease to the non-zero value the power capability setting as a result of determining that the measured power output reaches or exceeds the at least one predetermined maximum power limit.

3. The system in accordance with claim 2, wherein:
the PMLD circuit is operable to receive an indication of a number of PEDs connected to the at least one PPCO circuit; and
the power capability setting is increased as a result of the PMLD circuit determining that the number of PEDs connected to the at least one PPCO circuit was reduced.

4. The system in accordance with claim 3, wherein:
the power capability setting is continuously broadcast from the PMLD circuit to the PEDs connected to the at least one PPCO circuit.

5. The system in accordance with claim 1, wherein:
the power capability setting indicates a maximum amount of power permitted for consumption by one PED connected to one PPCO circuit within an area on the airplane; and
the predetermined maximum power limit indicates a total maximum amount of power permitted for consumption by all PEDs connected to all PPCO circuits within the area on the airplane.

6. The system in accordance with claim 1, wherein:
the at least one PPCO circuit includes a DC/DC converter;
the power capability setting represents a DC wattage value; and
the negotiation of the power contract between the PED and the at least one PPCO circuit includes the PED requesting the DC power at a DC voltage value, and the at least one PPCO circuit utilizing the DC/DC converter to change the DC power supplied to the PED to include the requested DC voltage value and a DC amperage value that does not exceed the DC wattage value represented by the power capability setting.

7. The system in accordance with claim 1, further comprising:
a configuration plug module (CPM) removably couplable to the PMLD circuit and including a reprogrammable non-transitory memory having stored thereon the at least one predetermined maximum power limit for upload into the PMLD circuit during an initiation/set-up phase of the system, the reprogrammable non-transitory memory being operably configured to be reprogrammed with different predetermined maximum power limits to accommodate use of the CPM to a plurality of airplane models.

8. The system in accordance with claim 1, wherein:
the at least one USB connector includes a USB type C connector with USB-PD capability and a USB type A connector.

9. The system in accordance with claim 1, wherein:
the source of AC power includes an engine-driven generator with a fixed power capacity.

10. The system in accordance with claim 1, wherein:
each of the PMLD circuit and the at least one AC/DC conversion circuits is disposed within an aircraft grade line replacement unit (LRU) housing.

11. The system in accordance with claim 1, wherein:
the at least one PPCO circuit includes a plurality of PPCO circuits, each of the plurality of PPCO circuits disposed on or proximate to a passenger seat within a passenger cabin of the airplane.

12. The system in accordance with claim 1, wherein:
the at least one predetermined maximum power limit includes a plurality of predetermined maximum power limits; and
each of the plurality of predetermined maximum power limits indicates a total maximum amount of power permitted for consumption by all PEDs within one of a plurality of aircraft cabin zones.

13. The system in accordance with claim 1, wherein:
the at least one AC/DC conversion circuit includes a plurality of AC/DC conversion circuits electrically coupled to the PMLD circuit and connected together in series in a daisy chain configuration with at least one power line and at least one data line between each of the plurality of daisy chained AC/DC conversion circuits.

14. The system in accordance with claim 1, wherein:
each of the at least one AC/DC conversion circuit:
is operably configured to receive the AC power and the power capability setting from the PMLD circuit;
includes a microcontroller unit, the microcontroller unit being operably configured to convert the power capability setting from the PMLD circuit into one of a plurality of pulse width modulation (PWM) frequencies, each one of the plurality of PWM frequencies different from each of the other ones of the plurality of PWM frequencies so as to uniquely indicate one of a plurality of predetermined power capability settings stored in a non-transitory memory; and
sends the converted one of the plurality of PWM frequencies to the at least one PPCO circuit for communication to the PED.

15. The system in accordance with claim 1, wherein:
the at least one AC/DC conversion circuit includes at least one data input operably configured to receive an attach detection signal from the at least one PPCO circuit, the attach detection signal indicating whether the PED is connected to the at least one PPCO circuit via the USB connector.

16. The system in accordance with claim 1, wherein:
the PPCO circuit includes a microcontroller unit communicatively coupled to a device policy manager, the microcontroller unit being operably configured to receive a pulse width modulation (PWM) frequency representing the power capability setting and convert the PWM frequency into a message for transmission to the device policy manager, the message indicating the power capability setting for the PED connected to the at least one PPCO circuit.

17. The system in accordance with claim 1, wherein:
each of the at least one PPCO circuit includes a microcontroller unit, a device policy manager, a protocol layer, a physical layer, a cable detector, a DC/DC converter, and a current sense circuit.

18. The system in accordance with claim 17, wherein the PPCO circuit further includes:
a $V_{REQ}$ line connecting the device policy manager to the microcontroller unit, the $V_{REQ}$ line operably configured to transmit a voltage change request from the PED connected to the PPCO circuit as part of the negotiation of the power contract; and
a $V_{SEL}$ line connecting the microcontroller unit to the DC/DC converter, the $V_{SEL}$ line operably configured to transmit a command to the DC/DC converter to change the DC voltage of the DC power supplied to the PED according to the voltage change request.

19. A power management and load distribution system comprising:
a source of alternating current (AC) power within an airplane having an airplane passenger cabin with a plurality of cabin zones; and
a configuration plug module (CPM) including a reprogrammable non-transitory memory having stored thereon a predetermined maximum power limit for each of the plurality of cabin zones;
a power management and load distribution (PMLD) circuit within the airplane, the PMLD circuit:
operable to receive the AC power from the source;
removably couplable to the CPM for receiving the predetermined maximum power limit for each of the plurality of cabin zones from the CPM; and
having a plurality of zone modules, each of the plurality of zone modules having at least one microcontroller unit and being operably configured to manage power for one of the plurality of cabin zones by: continuously monitoring a power output to the respective cabin zone, comparing the power output of the respective cabin zone to the predetermined maximum power limit of the respective cabin zone, and determining a power capability setting for the respective cabin zone based on the comparison;
a plurality of AC/DC conversion circuits communicatively coupled to the PMLD circuit and operable to receive the AC power from the PMLD circuit, each of the plurality of AC/DC conversion circuits being operable to:
convert the AC power from the PMLD circuit into a DC power for supplying the DC power to one of the plurality of cabin zones; and
receive the power capability setting from the zone module configured to manage power for the respective cabin zone;
at least one programmable output capability outlet (PPCO) circuit communicatively coupled to one of the plurality of AC/DC conversion circuits, the at least one PPCO circuit:
disposed on or proximate a passenger seat within one of the plurality of cabin zones;
operably configured to receive the DC power and the power capability setting from the respective AC/DC conversion circuit;
including at least one USB connector selectively couplable to a personal electronic device (PED) associated with an aircraft cabin passenger seated within the passenger seat;

operable to charge the PED coupled to the at least one USB connector at an amount of DC power indicated by the power capability setting; and operably configured to negotiate a power contract with the PED.

20. The system in accordance with claim 19, wherein:

negotiation of the power contract between the at least one PPCO circuit and the PED includes a request from the PED to the at least one PPCO circuit to change at least one of a DC amperage and a DC voltage of the DC power supplied to the PED.

* * * * *